United States Patent [19]

Hara et al.

[11] Patent Number: 4,772,515

[45] Date of Patent: Sep. 20, 1988

[54] RELEASING SILICONE COMPOSITION COMPRISING AN ORGANOPOLYSILOXANE HAVING AT LEAST TWO SPECIFIC ORGANOSILOXY GROUPS IN THE MOLECULE

[75] Inventors: Yasuaki Hara; Kazuma Momii, both of Annaka, Japan

[73] Assignee: Shin Etsu Chemical Company, Ltd., Tokyo, Japan

[21] Appl. No.: 77,115

[22] Filed: Jul. 20, 1987

[30] Foreign Application Priority Data

Jul. 21, 1986 [JP] Japan .................................. 61-171315

[51] Int. Cl.$^4$ ................................................ B32B 9/04
[52] U.S. Cl. ...................................... 428/447; 427/387; 427/388.1; 528/15; 528/31; 528/32; 525/478
[58] Field of Search ............................ 528/32, 15, 31; 428/447, 450; 525/478; 427/387, 388.1

[56] References Cited

U.S. PATENT DOCUMENTS

| | | | |
|---|---|---|---|
| 3,427,720 | 2/1969 | Berman et al. | 32/27 |
| 3,922,443 | 11/1975 | Brown et al. | 428/447 |
| 4,018,734 | 4/1977 | Dumoulin | 428/447 |
| 4,032,502 | 6/1977 | Lee et al. | 528/15 |
| 4,057,596 | 11/1977 | Takamizawa et al. | 427/387 |
| 4,071,644 | 1/1978 | Grenoble | 427/302 |
| 4,082,726 | 4/1978 | Mine et al. | 428/447 |
| 4,157,357 | 6/1979 | Mine et al. | 260/825 |
| 4,386,135 | 5/1983 | Campbell et al. | 528/15 |
| 4,609,590 | 9/1986 | Suzuki et al. | 528/32 |

*Primary Examiner*—Melvyn I. Marquis
*Attorney, Agent, or Firm*—Lowe, Price, LeBlanc, Becker & Shur

[57] ABSTRACT

A releasing silicone composition comprising three ingredients including an organopolysiloxane having at least two specific organosiloxy units having an alkenyl group, a methylhydrogenpolysiloxane material, and a platinum catalyst.

14 Claims, No Drawings

RELEASING SILICONE COMPOSITION COMPRISING AN ORGANOPOLYSILOXANE HAVING AT LEAST TWO SPECIFIC ORGANOSILOXY GROUPS IN THE MOLECULE

BACKGROUND OF THE INVENTION

1. Field of the Invention

This invention relates to releasing agents and more particularly, to a solvent-free releasing silicone composition which is suitable for application to a substrate such as paper with or without lamination, plastic films or the like, in order to impart releasing or non-adhesive or tack-free properties to the substrate.

2. Description of the Prior Art

Various types of solvent-free releasing silicone compositions have been proposed to prevent adhesion between one side of a substrate such as paper or a plastic film or sheet and an adhesive layer applied on another side of the substrate. For instance, Japanese Laid-open Patent Application Nos. 49-47426, 50-141595, 52-34791 and 57-77395 describe these types of compositions.

However, these known releasing silicone compositons have the drawback that although they exhibit good adhesion to papers, laminated papers and metal foils, it takes a relatively long curing time when the composition is required to be cured at low temperatures. Especially, when the composition is applied onto plastic films such as polyethylene terephthalate and polypropylene films, the curing at low temperatures is essential for preventing shrinkage of the film during the curing. In addition, such low temperature curing over a long term may frequently result in rather poor adhesion to the film substrate. In an extreme case where the silicone composition is cured under high humidity conditions, the resultant layer of the composition is inconvenientlly liable to fall off in rags when rubbed with a finger about one day after the curing.

For the purpose of establishing good adhesion of the organopolysiloxane composition to plastic films, attempts have been made to add a certain type of silane or siloxane to the composition, thereby imparting self-adhesiveness or stickiness to the composition (such as disclosed in Japanese Laid-open Patent Application No. 46-2187 and Japanese Patent Publication No. 2-9464). In this type of composition, curing is completed based on a condensation reaction, which requires high temperatures for the curing. Such high temperatures are not favorable when plastic films are used as a substrate.

Japanese Laid-open Patent Application Nos. 52-24258 and 52-147657 and Japanese Patent Publication No. 57-1471 describe compositions in which a siloxane compound having epoxy groups at ends or side chains thereof is used and cured by its addition reaction. However, this compound also requires high curing temperatures, and the resultant cured film does not exhibit non-adhesiveness and is unstable. In addition, the adhesiveness to substrate is not sufficient and thus, this composition is not satisfactory for use with plastic films.

For improving the adhesiveness, a substrate or adherend may be treated with a primer. This treatment is additional and is not convenient in view of the working time, labor and cost.

SUMMARY OF THE INVENTION

It is therefore an object of the invention to provide a releasing silicone composition which overcomes the drawbacks of the prior art compositions.

It is another object of the invention to provide a releasing silicone composition which is readily cured on a substrate by application of heat at 80° to 200° C. for 2 to 30 seconds or by irradiation of UV rays for 0.2 seconds or over.

It is a further object of the invention to provide a releasing silicone composition which has good adherence to plastic films and good releasing properties with a good abrasion resistance under high temperature and high humidity conditions.

It is a still further object of the invention to provide a releasing silicone composition which can be applied onto a substrate without dilution with organic solvents, and can be cured within a short time at relatively low temperatures, whereby when plastic films are used as the substrate, they do not suffer shrinkage during the curing.

The present invention contemplates to provide a releasing silicone composition which comprises:

(1) 100 parts by weight of an organopolysiloxane having, in one molecule, at least two units of the following general formula

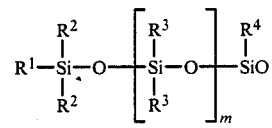

in which $R^1$ represents an alkenyl group, each $R^2$, each $R^3$ and $R^4$ independently represent a hydrogen atom, a hydroxyl group or a monovalent organic group, and m is an integer of from 0 to 300, the organopolysiloxane having a viscosity of from 2 to 10,000 centistokes at 25° C.;

from 10 to 100 parts by weight of a methylhydrogenpolysiloxane; and a platinum catalyst used in a catalytic amount.

This composition is of the solvent-free type and is characterized by the use of an aliphatic unsaturated unit or group-containing organopolysiloxane in combination with the methylhydrogenpolysiloxane and the platinum catalyst. The composition can be readily cured by heat treatment at a temperataure of from 80° to 200° C. for 2 to 30 seconds or by application of UV rays from a UV irradiator of, for example, 80 W/cm. The cured film exhibits good adhesion to various substrates and particularly, to plastic films while showing good releasing properties and a good abrasion resistance even under high temperature and high humidity conditions. The cured film does not adversely influence adhesives applied on the other side of a substrate when contacting with the adhesive over a long term.

DETAILED DESCRIPTION AND PREFERRED EMBODIMENTS OF THE INVENTION

The first ingredient used in the releasing silicone composition of the invention is an organopolysiloxane having, in one molecule, at least two units or organosiloxy groups of the following general formula

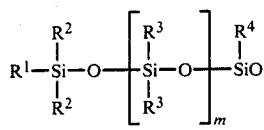

In the above formula, $R^1$ represents an alkenyl group such as a vinyl group, an allyl group, a propenyl group or the like. $R^2$, $R^3$ and $R^4$ may be the same or the different and represent a hydrogen atom, a hydroxy group or a monovalent organic group including an unsubstituted or substituted monovalent hydrocarbon group. Examples of the unsubstituted or substituted monovalent hydrocarbon group include an alkyl group such as a methyl group, an ethyl group, a propyl group, a butyl group or the like, a cycloalkyl group such as a cyclohexyl group, an alkenyl group such as a vinyl group, an allyl group or the like, an aryl group such as a phenyl group, a tolyl group or the like, and the above-indicated groups in which part or all of the hydrogen atoms bonded to the carbon atom or atoms are substituted with a halogen atom, a cyano group or the like, e.g. a chloromethyl group, a trifluoropropyl group, a cyano ethyl group and the like. Other monovalent organic groups such as alkoxy groups and epoxy groups may also be used. Examples of the alkoxy group include a methoxy group, an ethoxy group, a propoxy group, a methoxyethoxy group and the like. As mentioned above, a hydroxy group may also be used for this purpose. m is an integer of from from 0 to 300, preferably from 0 to 100.

In the formula, at least 80% of the total number of $R^2$ and $R^3$ should preferably be a methyl group. $R^4$ is also preferably a methyl group.

The organopolysiloxane should preferably have a linear molecular structure although an organopolysiloxane having a branched or reticulated structure may be used provided that the at least two organosiloxy groups are contained in one molecule. If the content of the alkenyl group represented by $R^1$ is less than 0.5 mole % based on the siloxane units, the curability becomes poor. On the other hand, when the content exceeds 40 mole %, the peel resistance of the cured film obtained from this composition becomes so high that it is, more or less, unlikely to release from an adhesive layer in practical applications. Accordingly, the content is generally in the range of from 0.5 to 40 mole %, preferably from 1.0 to 30 moles %.

The organopolysiloxane is generally applied onto a substrate in a thickness of not larger than 5 micrometers and should have a relatively low viscosity at 25° C. However, if the viscosity is lower than 2 centistokes, it is difficult to form a uniform, thin layer on a substrate at a high coating speed by any known coating methods although such a low viscosity permits good wettability with a substrate. Over 10,000 centistokes, the wettability with the substrate becomes poor. In addition, the bubbles involved in the composition are rarely removed before completion of curing. This will result in a cured film having pinholes. Thus, the viscosity of the organopolysiloxane should be within a range of from 2 to 10,000 centistokes.

The organopolysiloxane described above is readily prepared, for example, by a process which comprises subjecting an alkyltrimethoxysilane and octamethylcyclotetrasiloxane in the presence of an alkali catalyst. The resultant polymer is hydrolyzed and condensed under acidic conditions along with an alkenylsiloxane of the following formula

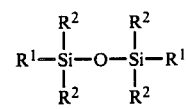

in which each $R^1$ and each $R^2$ have the same meanings as defined hereinbefore, respectively. Alternatively, after an alkyltrimethoxysilane is hydrolyzed and condensed under acidic conditions along with an alkenylsiloxane of the above-indicated formula, the resultant product and octamethylcyclotetrasiloxane may be polymerized in the presence of an alkali catalyst. Examples of the alkali catalyst include alkali metal hydroxides such as sodium hydroxide, potassium hydroxide and the like, alkali metal salts of silanols, quaternary ammonium hydroxide and the like.

Typical examples of the organopolysiloxane include those of the following formulae (I) to (X):

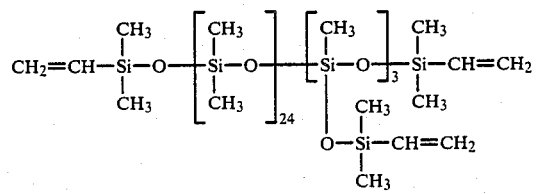

(I)

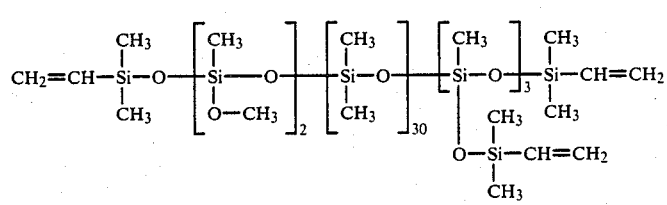

(II)

-continued

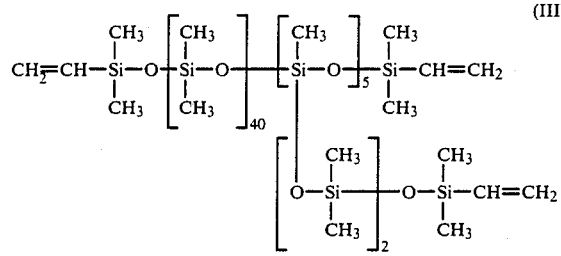 (III)

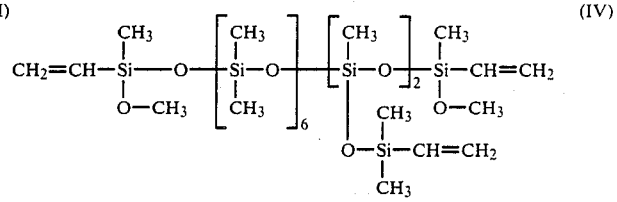 (IV)

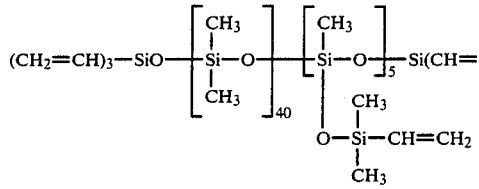 (V)

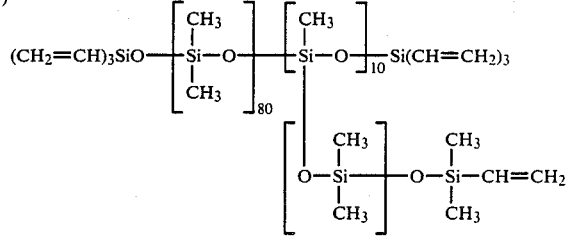 (VI)

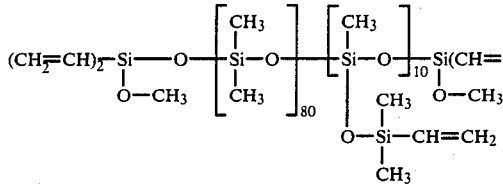 (VII)

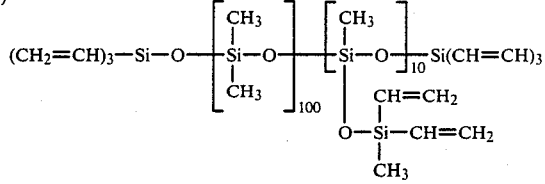 (VIII)

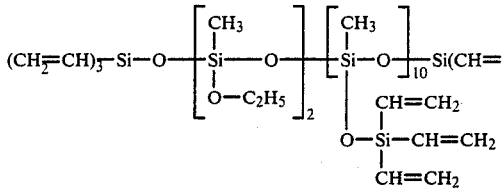 (IX)

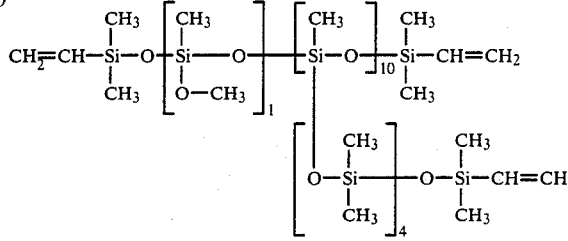 (X)

The second ingredient of the silicone composition according to the invention is an organohydrogenpolysiloxane. This organohydrogenpolysiloxane may be one which is ordinarily used in this type of addition reaction-type silicone composition. More particularly, this polysiloxane should have at least two hydrogen atoms, preferably three or more hydrogen atoms, joined to the silicon atom in one molecule of the polysiloxane. The other groups should preferably be a methyl group whose content is not less than 80 mole % of the total of the other groups. Specific examples of this type of polysiloxane are homopolymers having recurring units of the formulae: $(CH_3)HSiO$, $HSiO_{1.5}$, and $(CH_3)_2HSiO_{0.5}$, and copolymers having recurring units of the above-indicated formulae with or without further recurring units of the formulae, $(CH_3)_2SiO$, $CH_3SiO_{1.5}$, and $(CH_3)_3SiO_{0.5}$. Preferably, the homopolymer having recurring units of the formula, $(CH_3)HSiO$, is used. These homopolymers or copolymers may be linear, branched or cyclic and should preferably have a viscosity of from 10 to 1,000 centistokes at 25° C. The amount of the polysiloxane may depend on the amount of the alkenyl group in the first ingredient. In view of the curing film-forming and peeling properties, the amount of the second ingredient is generally in the range of from 1.0 to 100 parts by weight per 100 parts by weight of the first ingredient.

The third ingredient in the composition of the invention is a platinum catalyst for the addition reaction between the first and the second ingredients. The catalyst of this type is known in the art and includes, for example, chloroplatinic acid, and complex salts of chloroplatinic acid and various olefins and vinyl siloxane. The chloroplatinic acid may be used in the form of an alcohol or aldehyde solution. Additionally, platinum black and platinum, which may be supported on various carriers, may also be used. These compounds are generally used in a catalytic amount. In order to obtain a cured film of good properties and to ensure good economy, the catalyst is used in the range of from 1 to 1,000 ppm, as platinum, per 100 parts by weight of the first ingredient.

The composition of the invention is prepared by merely mixing predetermined amounts of the first to three ingredients. Preferably, the first and second ingredients are first uniformly mixed, to which the third ingredient is added. For the purpose of retarding the activity of a platinum catalyst, suitable retarders may be added, if necessary, including, for example, various organic nitrogencontaining compounds, organic phosphorous compounds, acetylene compounds, oxime compounds and organic chlorine compounds.

The composition of the invention exhibits good adherence to substrates without addition of adhesion improvers and/or fillers and the resulting cured film has a good abrasion resistance. If necessary, adhesion improvers such as γ-glycidoxypropyltrimethoxysilane, γ-methacryloxypropyltrimethoxysilane or co-hydrolyzates of these silane compounds may be added in amounts not impeding the properties of the composition. Moreover, inorganic fillers or pigments such as dry process silica such as fumed silica, wet process silica, titanium oxide, potassium oxide, carbon black, mica and the like may be added, if necessary, in suitable amounts.

The thus obtained composition of the invention should preferably have a viscosity at 25° C. of from 50 to 10,000 centistokes although a proper viscosity should be determined depending on the amount and manner of coating, and/or the type of material to be coated. For instance, when the composition is applied in an amount of about 0.3 g/m² onto plastic films such as polyethylene laminated papers or metallic foils by known techniques using a roll coater, a gravure coater, an air coater, a curtain flow coater or an offset transfer roll coater, a low to moderate viscosity of from 50 to 3,000 centistokes, is appropriate. For substrates which tend to soak up the a liquid, e.g. glassine paper, kraft paper, clay-undercoated paper and the like, higher viscosities are used.

The composition of the invention applied onto the substrate is cured by application of heat at a temperature of from 80° to 200° C. for 2 to 30 seconds or by application of UV rays from a UV irradiator of, for example, 80 W/cm for 0.2 seconds or over. The composition may be applied onto a substrate as it is without dilution with organic solvents, permitting energy saving, safety and pollution-free operations. The curing is completed under such low temperature and short time conditions as mentions above. Thus, plastic films can be used as a substrate without shrinkage during the curing process. In addition, the cured film has good adhesion to not only paper-base substrates, but also plastic films and has also a good peel property and an abrasion resistance. Thus, the composition of the invention is particularly useful in treatment of plastic films and metallic films.

The present invention is more particularly described by way of examples, in which parts are by weight and the viscosity indicated is a measurement at 25° C.

The measurements of physical properties used in the examples are described below.

Curability: a predetermined amount of a composition of the invention was applied onto a thin film or sheet substrate and heated in a hot air-circulating dryer oven at a predetermined temperature to measure a time before the film was completely cured. The completion of the curing was determined at the time when the applied film did not drop off and did not become whitened upon rubbing with a finger.

Adhesion or adhesive property: the thin film having a cured film formed by the above procedure was kept in a temperature and humidity-controlled chamber at 40° C. and 95% R.H. for predetermined days. The cured film was intensely rubbed with a finger ten times, and the adhesion was judged in view of the degrees of smearing, whitening and fallingoff.

Peel force: a silicone composition was applied onto a substrate in an amount of 0.8 g/m² and cured by thermal treatment in a hot air-circulating dryer oven under conditions of 120° C. and 30 minutes. Thereafter, a polyester film was placed on the cured film, followed by placing a load of 20 g/cm² at 70° C. for 20 hours and returning to a temperature of 25° C. The peel force was determined by the use of an autograph at an angle of peeling of 180° C. and a peeling rate of 0.3 m/minute.

Residual adhesion rate: the polyester film used for the measurement of the peeling force was placed on a stainless steel plate on the surface which has been in face-to-face relation with the cured film, followed by pressing the polyester film against the steel plate by a 2 kg rubber roller which was reciprocatingly moved once. The polyester film was subjected to measurement of a peeling resistance or adhesion strength in the same manner as in the peel force. For reference, a fresh polyester film which was not subjected to the measurement of the peel force was placed on a stainless steel plate and pressed by one reciprocating movement of a 2 Kg rubber weight. The adhesion strength was measured and the residual adhesion rate of each sample was expressed in terms of percentage as an index to the reference sample taken as 100.

EXAMPLE 1 AND COMPARATIVE EXAMPLES 1 AND 2

68 parts of methyltrimethoxysilane of the formula, $CH_3Si(OCH_3)_3$, and 444 parts of octamethylcyclotetrasiloxane of the formula

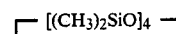

were copolymerized in the presence of an alkali catalyst for 5 hours. Thereafter, unreacted monomers were removed by reduced pressure distillation to obtain a polymer having a viscosity of 19.7 centistokes.

20 parts by weight of tetramethyldivinyl disiloxane of the following formula were added to 180 parts by weight of the polymer

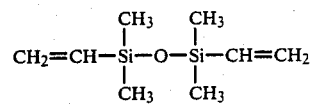

The mixture was hydrolyzed and condensed in an aqueous hydrochloric acid solution, followed by reduced pressure distillation to remove low melting point matters therefrom to obtain a polymer having a viscosity of 360 centistokes (polymer I). The polymer I had the following average compositional formula

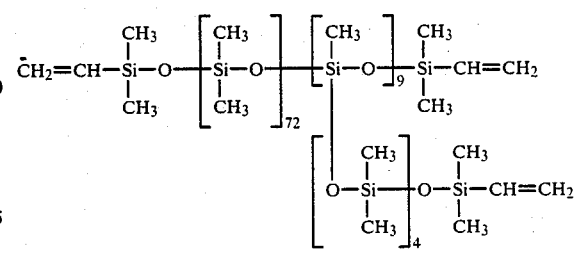

and had a vinyl group content of 0.15 moles/100 g.

100 parts of the polymer I were added to 20 parts of methylhydrogenpolysiloxane blocked with a trimethylsilyl group at opposite ends of the molecular chain and having 90 mole % of CH₃HSiO units and a viscosity of 100 centistokes and 2.0 parts of 3-methyl-1-butane of the following formula, followed by uniform mixing under agitation

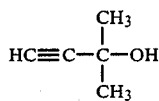

Thereafter, 3 parts of a complex salt of chloroplatinic acid and vinyl siloxane (80 ppm calculated as platinum) was added to the uniform mixture to obtain composition A.

For comparison, the above procedure was repeated using, instead of polymer I, 100 parts by weight of dimethylvinylpolysiloxane of the following formula having a viscosity of 140 centistokes or 100 parts of dimethylvinylpolysiloxane of the following formula having a viscosity of 162 centistokes, thereby obtaining compositions B and C, respectively.

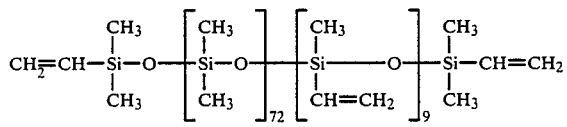

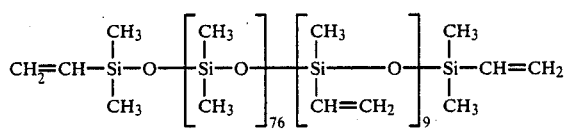

These compositions A, B and C were each applied onto a 30 micrometer thick polypropylene film and cured by thermal treatment at 100° C. or 120° C. The curability of the film, and the adhesion, peel force and residual adhesion rate of the resultant film were determined. The results are shown in Table 1.

TABLE 1

| Composition No. | Example 1<br>A | Comparative Example 1<br>B | Comparative Example 2<br>C |
|---|---|---|---|
| Curability (seconds):<br>Curing Conditions | | | |
| 100° C. | 21 | 32 | 38 |
| 120° C. | 12 | 20 | 23 |
| Adhesion:<br>Curing Conditions | | | |
| 100° C. × 30 seconds | after 7 days, no whitening, smearing or falling off | after 1 day, considerable degrees of whitening and falling off | smearing |
| 120° C. × 10 seconds | after 7 days, no whitening, smearing or falling off | smearing | smearing |
| 120° C. × 30 seconds | after 7 days, no whitening, smearing or falling off | after 1 day, considerable degrees of whitening and falling off | after 1 day, considerable degrees of whitening & falling off |
| Peel Force (g/25 mm):<br>Curing Conditions | | | |
| 120° C. × 30 seconds | 8 | 10 | 9 |
| Residual Adhesion Rate (%):<br>Curing Conditions | | | |
| 120° C. × 30 seconds | 98 | 94 | 96 |

EXAMPLE 2 AND COMPARATIVE EXAMPLE 3

26 parts of tetramethyldivinyldisiloxane as used in Example 1 were added to 150 parts of methylmethoxysiloxane of the following formula

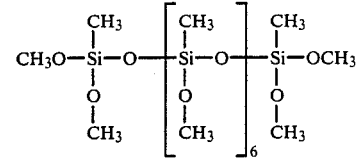

Thereafter, the mixture was maintained at 0° to 5° C., into which 33 parts of isopropyl alcohol, 16 parts of water and 35 parts of hydrochloric acid were dropped for reaction under acidic conditions. The acid was separated from the reaction mixture, followed by washing with water and removing unreacted compounds by distillation under reduced pressure to obtain 132 parts of polysiloxane having a viscosity of 85 centistokes. 217 parts of octamethylcyclotetrasiloxane of the formula,

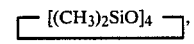

and 7 parts of tetramethyltetravinylcyclotetrasiloxane of the formula,

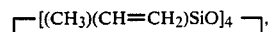

were added to 132 parts of the above polysiloxane and polymerized in the presence of an alkali catalyst. The resultant system was subjected to removal of low melting matters therefrom to obtain a polymer having a viscosity of 2,100 centistokes (polymer II). The polymer II had the following average compositional formula

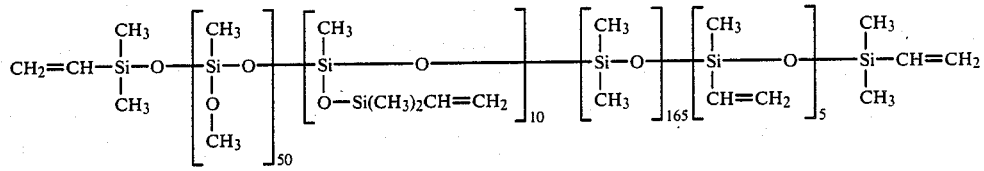

Thereafter, 8.2 parts of methylhydrogenpolysiloxane blocked with a trimethylsilyl group at opposite ends of the molecular chain and having 75 mole % of CH3HSiO units and a viscosity of 50 centistokes and 1.2 parts of 3-methyl-1-butine as used in Example 1 were added to 100 parts of the polymer II and uniformly mixed under agitation. 5 parts of a complex salt of chloroplatinic acid and vinyl siloxane (100 ppm calculated as platinum) were added to the mixture to obtain composition D.

For comparison, composition E was prepared by a similar procedure in which 100 parts of dimethylvinylpolysiloxane of the following formula having a viscosity of 1,00 centistokes were used instead of polymer II

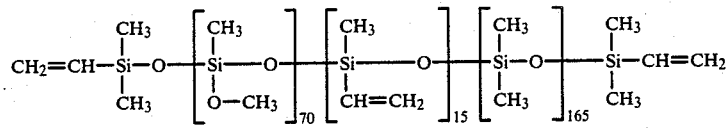

The composition D and E were each applied onto a polypropylene film and thermally cured at 100° C. and 120° C. in the same manner as in Example 1. The cured films were subjected to measurement of the physical properties as in Example 1. The results are shown in Table 2.

TABLE 2

| Composition No. | Example 2 D | Comparative Example 3 E |
|---|---|---|
| Curability (seconds): Curing Conditions | | |
| 100° C. | 26 | 40 |
| 120° C. | 16 | 28 |
| Adhesion: Curing Conditions | | |
| 100° C. × 30 seconds | after 7 days, no whitening, smearing or falling off | smearing |
| 120° C. × 30 seconds | after 7 days, no whitening, smearing or falling off | after 1 day, considerable degrees of whitening and dropping off |

TABLE 2-continued

| Composition No. | Example 2 D | Comparative Example 3 E |
|---|---|---|
| 120° C. × 40 seconds | after 7 days, no whitening, smearing or falling off | after 1 day, considerable degrees of whitening and dropping off |
| Peel Force (g/25 mm): Curing Conditions | | |
| 120° C. × 30 seconds | 7 | 8 |
| Residual Adhesion Rate (%): Curing Conditions | | |
| 120° C. × 30 seconds | 96 | 95 |

EXAMPLE 3 AND COMPARATIVE EXAMPLE 4

To 100 parts of dimethylvinylpolysiloxane of the following formula having a vinyl group content of 0.55 moles/100 g and a viscosity of 210 centistokes

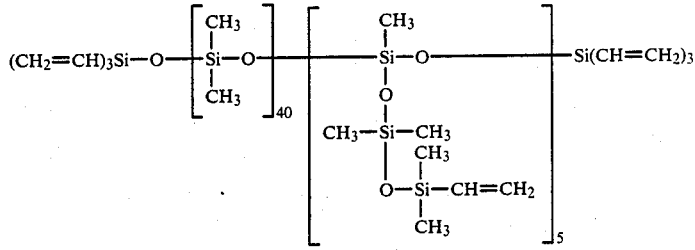

were added 30 parts of methylhydrogenpolysiloxane blocked with a dimethylhydrosilyl group at opposite ends of the molecular chain and having 95 mole % of (CH3)HSiO units and a viscosity of 23 centistokes and 0.3 parts of 3,5-dimethyl-1-hexine-3-ol of the following formula

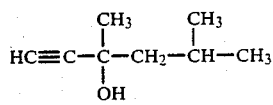

followed by uniform mixing under agitation. 3 parts of a complex salt of chloroplatinic acid and vinyl siloxane (80 ppm calculated as platinum) were added to the mixture to obtain composition F.

For comparison, composition G was prepared using, instead of the dimethylvinylpolysiloxane, 100 parts of dimethylvinylvinylsiloxane of the following formula having a viscosity of 88 centistokes

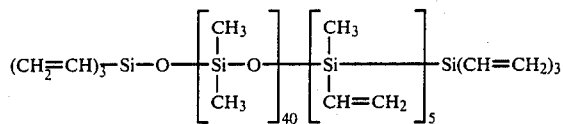

The compositions F and G were each applied onto a polypropylene film in the same manner as in Example 1 and cured by heating at 100° C. and 120° C., and were subjected to measurements of physical properties as in Example. The results are shown in Table below.

TABLE 3

| Composition No. | Example 3 F | Comparative Example 4 G |
|---|---|---|
| Curability (seconds): | | |
| Curing Conditions | | |
| 100° C. | 20 | 34 |
| 120° C. | 12 | 22 |
| Adhesion: | | |
| Curing Conditions | | |
| 100° C. × 30 seconds | after 7 days, no whitening, smearing or falling off | smearing |
| 120° C. × 30 seconds | after 7 days, no whitening, smearing or falling off | after 1 day, degrees of whitening and falling off |
| 120° C. × 40 seconds | after 7 days, no whitening, smearing or falling off | after 2 days, considerable degrees of whitening and falling off |

As will be apparent from the results of Tables 1, 2 and 3, the compositions of the invention are significantly better than those compositions of the comparative examples with respect to all the physical properties tested.

What is claimed is:

1. A releasing silicone composition which comprises: 100 parts by weight of an organopolysiloxane having, in one molecule, at least two units of the following general formula (1)

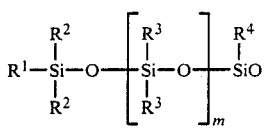

in which $R^1$ represents an alkenyl group, each $R^2$, each $R^3$ and $R^4$ independently represent a hydrogen atom, a hydroxyl group or a monovalent organic group, and m is an integer of from 0 to 300, the organopolysiloxane having a viscosity of from 2 to 10,000 centistokes at 25° C.;

from 10 to 100 parts by weight of a organohydrogenpolysiloxane; and a platinum catalyst used in a catalytic amount.

2. A releasing silicone composition according to claim 1, wherein $R^2$, $R^3$ and $R^4$ are independently a monovalent organic group.

3. A releasing silicone composition according to claim 1, wherein at least 80% of the total number of $R_2$ and $R_3$ consists of a methyl group.

4. A releasing silicone composition according to claim 1, wherein the content of the alkenyl group is in the range of from 0.5 to 40 mole %.

5. A releasing silicone composition according to claim 4, wherein the content is in the range of from 1.0 to 30 mole %.

6. A releasing silicone composition according to claim 1, wherein said organopolysiloxane has a viscosity of from 2 to 10,000 centistokes at 25° C.

7. A releasing silicone composition according to claim 1, wherein said organohydrogenpolysiloxane is a methylhydrogenpolysiloxane which has at least two hydrogen atoms joined to silicon atoms in the molecule.

8. A releasing silicone composition according to claim 7, wherein the organohydrogenpolysiloxane has 80 mole % of methyl groups other than the at least two hydrogen atoms.

9. A releasing silicone composition according to claim 1, wherein said methylhydrogenpolysiloxane is a polymer of recurring units of the formula, $-(CH_3)HSiO-$.

10. A releasing silicone composition according to claim 1, wherein said platinum catalyst is platinum.

11. A releasing silicone composition according to claim 1, wherein said platinum catalyst is a platinum compound.

12. A releasing silicone composition according to claim 11, wherein said platinum compound is a complex salt of chloroplatinic acid and an olefin or vinyl siloxane.

13. A releasing silicone composition according to claim 1, wherein said catalyst is used in an amount of from 1 to 1,000 ppm calculated as platinum.

14. A releasing article of a plastic film or metallic foil having a cured layer of the composition of claim 1.

* * * * *